(12) United States Patent
Shirai et al.

(10) Patent No.: US 6,553,282 B2
(45) Date of Patent: Apr. 22, 2003

(54) METHOD AND APPARATUS FOR RECOGNIZING SHAPE OF ROAD

(75) Inventors: Noriaki Shirai, Kariya (JP); Katsuhiro Morikawa, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/790,887

(22) Filed: Feb. 23, 2001

(65) Prior Publication Data

US 2001/0020201 A1 Sep. 6, 2001

(30) Foreign Application Priority Data

Mar. 6, 2000 (JP) ........................................ 2000-060646

(51) Int. Cl.$^7$ ................................................ G06F 7/00
(52) U.S. Cl. ............................................................ 701/1
(58) Field of Search ........................... 701/1, 301, 302; 340/435, 436; 180/167, 168, 169

(56) References Cited

FOREIGN PATENT DOCUMENTS

| JP | 8-249598 | 9/1996 |
|---|---|---|
| JP | 10-239436 | 9/1998 |

*Primary Examiner*—Yonel Beaulieu
(74) *Attorney, Agent, or Firm*—Posz & Bethards, PLC (57) ABSTRACT

A transmission wave is applied to a predetermined angular range in a width-wise direction of a vehicle. A position of each object and a relative speed of the object are detected on the basis of the reflected wave. A determination is made as to whether each object is moving or stationary on the basis of the detected relative speed of the object and a speed of the vehicle. For at least one of right-hand and left-hand sides of the vehicle, calculation is given of a vehicle width-wise direction position where each stationary object effective for road shape recognition passes through the related side of the vehicle. The calculated vehicle width-wise direction position is memorized. A line connecting the memorized vehicle width-wise direction position and the detected position of the currently handled object corresponding to the effective stationary object is recognized as a road edge.

15 Claims, 8 Drawing Sheets

METHOD AND APPARATUS FOR RECOGNIZING SHAPE OF ROAD

BACKGROUND OF THE INVENTION

1. Field of the Invention

This invention relates to a method of recognizing the shape of a road which can be used by, for example, a system provided on a vehicle. In addition, this invention relates to an apparatus for recognizing the shape of a road which can be used by, for example, a system provided on a vehicle. Furthermore, this invention relates to a recording medium which stores a computer program for recognizing the shape of a road.

2. Description of the Related Art

A known obstacle detecting apparatus for a vehicle emits a forward wave beam such as a light beam or a millimeter wave beam from the body of the vehicle, and controls the forward wave beam to periodically scan a given angular region in front of the body of the vehicle. In the case where an obstacle exists in the given angular region, the forward wave beam encounters the obstacle before being at least partially reflected thereby. A portion of the reflected wave beam returns to the apparatus as an echo wave beam. The apparatus detects the obstacle in response to the echo wave beam.

The known obstacle detecting apparatus is used in a warning system for a vehicle which alarms when an obstacle such as a preceding vehicle exists in a given angular region in front of the present vehicle. The known obstacle detecting apparatus is used also in a system for a vehicle which controls the speed of the vehicle to maintain a proper distance between the vehicle and a preceding vehicle.

The known obstacle detecting apparatus additionally has the function of determining whether or not the detected obstacle is a preceding vehicle. In general, this determination is responsive to the output signals from a steering angle sensor and a yaw rate sensor. In the case where the present vehicle is traveling along a straight portion of a road while a preceding vehicle is traveling along a curved road portion extending ahead of the straight road portion, the known obstacle detecting apparatus has a chance of erroneously determining the preceding vehicle.

In view of such a problem in the known obstacle detecting apparatus, it is proposed to recognize the shape of a road from objects on the sides of the road such as delineators. When there is a plurality of sensed delineators, a road edge or edges can be detected from the sensed delineators. On the other hand, when there is only one sensed delineator, a road edge can not be detected.

Japanese patent application publication number 8-249598 discloses an apparatus for sensing delineators and recognizing a road shape from information about the sensed delineators. According to Japanese application 8-249598, in the case where only one sensed delineator exists, a road shape is recognized from the trajectory or locus of the delineator which reflects relative motion between the present vehicle and the delineator. When the present vehicle is traveling along a curved road with a constant radius of curvature, it is possible to accurately recognize the road shape from the trajectory of the delineator. The accurate recognition of the road shape provides accurate detection of a preceding vehicle. On the other hand, when the present vehicle is traveling along a curved road with a varying radius of curvature, the shape of a road portion extending ahead of the sensed delineator can not be accurately recognized from the delineator trajectory.

Japanese patent application publication number 10-239436 discloses an apparatus for detecting the vehicle-to-vehicle distance. The apparatus in Japanese application 10-239436 emits a forward laser beam, and controls the forward laser beam to periodically scan a given angular region in front of the body of the present vehicle. The apparatus in Japanese application 10-239436 detects objects in the given angular range from return laser beams coming therefrom. Specifically, the apparatus detects the distances to the objects and the directions (the angular positions) of the objects relative to the present vehicle. The detected objects include reflectors on the right-hand and left-hand sides of a road. In the apparatus of Japanese application 10-239436, the shape of the road is recognized from the loci (trajectories) of detected reflectors on the road sides. The apparatus of Japanese application 10-239436 has a problem similar to that in the apparatus of Japanese application 8-249598.

SUMMARY OF THE INVENTION

It is a first object of this invention to provide a method of accurately recognizing the shape of a road even when only one sensed delineator exists.

It is a second object of this invention to provide an apparatus for accurately recognizing the shape of a road even when only one sensed delineator exists.

It is a third object of this invention to provide a recording medium which stores a computer program for accurately recognizing the shape of a road even when only one sensed delineator exists.

A first aspect of this invention provides a method of applying a transmission wave to a predetermined angular range in a width-wise direction of a vehicle, and recognizing a shape of a road extending ahead of the vehicle on the basis of a reflected wave which results from reflection of the transmission wave. The method comprises the steps of detecting a position of each object and a relative speed of the object on the basis of the reflected wave; determining whether each object is moving or stationary on the basis of the detected relative speed of the object and a speed of the vehicle; for at least one of right-hand and left-hand sides of the vehicle, calculating and memorizing a vehicle width-wise direction position where each stationary object effective for road shape recognition passes through the related side of the vehicle on the basis of the detected position of the object and a result of determining whether the object is moving or stationary; and recognizing a line connecting the memorized vehicle width-wise direction position and the detected position of the currently handled object corresponding to the effective stationary object as a road edge.

A second aspect of this invention is based on the first aspect thereof, and provides a method further comprising the steps of calculating and memorizing an average vehicle width-wise direction position among the calculated vehicle width-wise direction positions; and using the average vehicle width-wise direction position in the road edge recognition.

A third aspect of this invention provides an apparatus for recognizing a road shape. The apparatus comprises radar means for applying a transmission wave to a predetermined angular range in a width-wise direction of a vehicle, and detecting a position of each object on the basis of a reflected wave which results from reflection of the transmission wave; and recognizing means for recognizing a shape of a road extending ahead of the vehicle on the basis of a result of detection by the radar means. The recognizing means comprises 1) object recognizing means for detecting a position of each object and a relative speed of the object on the basis of the result of detection by the radar means, and for determining whether the object is moving or stationary on the basis of the detected relative speed of the object and a speed of the vehicle; 2) position calculating and memorizing means for, regarding at least one of right-hand and left-hand sides of the vehicle, calculating and memorizing a vehicle width-wise direction position where each stationary object effective for road shape recognition passes through the related side of the vehicle on the basis of a result of function by the object recognizing means; 3) correspondence determining means for determining whether or not an object currently handled by the object recognizing means corresponds to the vehicle width-wise direction position memorized by the position calculating and memorizing means; and 4) road edge recognizing means for, in cases where the correspondence determining means determines that the object currently handled by the object recognizing means corresponds to the vehicle width-wise direction position, recognizing a line connecting the vehicle width-wise direction position and the detected position of the object currently handled by the object recognizing means as a road edge.

A fourth aspect of this invention is based on the third aspect thereof, and provides an apparatus wherein the position calculating and memorizing means comprises means for calculating and memorizing an average among vehicle width-wise direction positions for effective stationary objects, wherein the correspondence determining means comprises means for using the average as the vehicle width-wise direction position, and wherein the road edge recognizing means comprises means for using the average as the vehicle width-wise direction position.

A fifth aspect of this invention is based on the third aspect thereof, and provides an apparatus wherein the position calculating and memorizing means comprises means for calculating and memorizing a vehicle width-wise direction position or an average position for the right-hand side of the vehicle, and means for calculating and memorizing a vehicle width-wise direction position or an average position for the left-hand side of the vehicle, wherein the correspondence determining means comprises means for determining whether or not a currently handled object corresponds to the vehicle width-wise direction position or the average position for the right-hand side of the vehicle, and means for determining whether or not a currently-handled object corresponds to the vehicle width-wise direction position or the average position for the left-hand side of the vehicle, and wherein the road edge recognizing means comprises means for recognizing right-hand and left-hand road edges on the basis of the vehicle width-wise direction positions or the average positions for the right-hand and left-hand sides of the vehicle and a result of function by the correspondence determining means.

A sixth aspect of this invention is based on the third aspect thereof, and provides an apparatus wherein the road edge recognizing means comprises means for, in cases where there are a plurality of objects determined to correspond to the vehicle width-wise direction position, implementing interpolation with respect to regions between the objects to form lines connecting the objects and recognizing the lines connecting the objects and a line connecting the vehicle width-wise direction position and the detected position of nearest one of the objects as a road edge.

A seventh aspect of this invention is based on the third aspect thereof, and provides an apparatus wherein the position calculating and memorizing means comprises means for calculating a circle whose tangent vector is equal to a relative speed vector of the effective stationary object, and whose center is on a vehicle width-wise direction, and means for using a point of intersection between the circle and the vehicle width-wise direction as the vehicle width-wise direction position.

An eighth aspect of this invention is based on the fourth aspect thereof, and provides an apparatus wherein the position calculating and memorizing means comprises means for calculating a first average among vehicle width-wise direction positions through a simple mean process, means for disregarding each vehicle width-wise direction position which differs from the first average by at least a predetermined value, means for, in cases where the number of the vehicle width-wise direction positions except the disregarded positions is equal to or greater than a predetermined number, calculating a second average among the vehicle width-wise direction positions except the disregarded positions and using the second average as the final average, and means for, in cases where the number of the vehicle width-wise direction positions except the disregarded positions is smaller than the predetermined number, determining that the calculation of the final average is impossible.

A ninth aspect of this invention is based on the third aspect thereof, and provides an apparatus wherein the correspondence determining means comprises means for setting an object as an object to be determined which satisfies execution allowance conditions such that the object is stationary and a distance to the object is equal to or less than a predetermined value, and means for, in cases where an absolute value of a difference between a vehicle width-wise direction position of the determination object and the vehicle width-wise direction position memorized by the position calculating and memorizing means is smaller than a predetermined value, determining that the determination object and the vehicle width-wise direction position correspond to each other.

A tenth aspect of this invention is based on the ninth aspect thereof, and provides an apparatus wherein the predetermined value in the execution allowance conditions which occurs in the presence of a chance that the vehicle changes lane is smaller than that occurring in the absence of the chance.

An eleventh aspect of this invention is based on the third aspect thereof, and provides an apparatus further comprising erroneous correspondence determining means for, regarding the object which is determined by the correspondence determining means to correspond to the vehicle width-wise direction position, determining whether or not an object on the opposite road side is erroneously determined to correspond to the vehicle width-wise direction position while considering conditions of a curvature of a road which occur during a predetermined time interval past, and for, when it is determined that an object on the opposite road side is erroneously determined to correspond to the vehicle width-wise direction position, correcting the determination and newly determining that the object does not correspond to the vehicle width-wise direction position and causing the object to be unused by the road edge recognizing means.

A twelfth aspect of this invention is based on the eleventh aspect thereof, and provides an apparatus wherein the erroneous correspondence determining means comprises means for calculating a circle whose tangent vector is equal to a relative speed vector of the effective stationary object, and whose center is on a vehicle width-wise direction, means for setting a radius of the circle as a curvature radius of a road, and means for, in cases where an absolute value of a difference between a vehicle width-wise direction position of the determination object which is predicted from a curvature radius available in a predetermined time interval past and the vehicle width-wise direction position memorized by the position calculating and memorizing means which corresponds to the opposite road side is smaller than a predetermined value, determining that the correspondence is erroneous.

A thirteenth aspect of this invention is based on the twelfth aspect thereof, and provides an apparatus wherein the erroneous correspondence determining means comprises means for, in cases where a stationary object on the opposite road side is not detected so that the vehicle width-wise direction position for the erroneous corresponding determination is unavailable, calculating a virtual vehicle width-wise direction position corresponding to the opposite road side on the basis of a road width and the vehicle width-wise direction position of the stationary object being the determination object, and using the virtual vehicle width-wise direction position in the erroneous correspondence determination.

A fourteenth aspect of this invention provides a recording medium storing a program for controlling a computer operating as the recognizing means in the apparatus of the third aspect of this invention.

A fifteenth aspect of this invention provides an apparatus for a vehicle which comprises first means for periodically detecting stationary objects in an area extending ahead of the vehicle; second means for calculating positions of the stationary objects detected by the first means relative to the vehicle; third means for calculating speeds of the stationary objects detected by the first means relative to the vehicle; fourth means for, from the positions calculated by the second means and the speeds calculated by the third means, predicting positions on a transverse axis with respect to the vehicle through which the stationary objects detected by the first means will pass as viewed from the vehicle; fifth means for selecting positions from among the positions predicted by the fourth means; sixth means for calculating an average position among the positions selected by the fifth means; seventh means for selecting at least one stationary object from among the stationary objects detected by the first means; and eighth means for recognizing a line connecting the average position calculated by the sixth means and the position of the stationary object selected by the seventh means as a road edge.

DETAILED DESCRIPTION OF THE INVENTION

Figure 1:
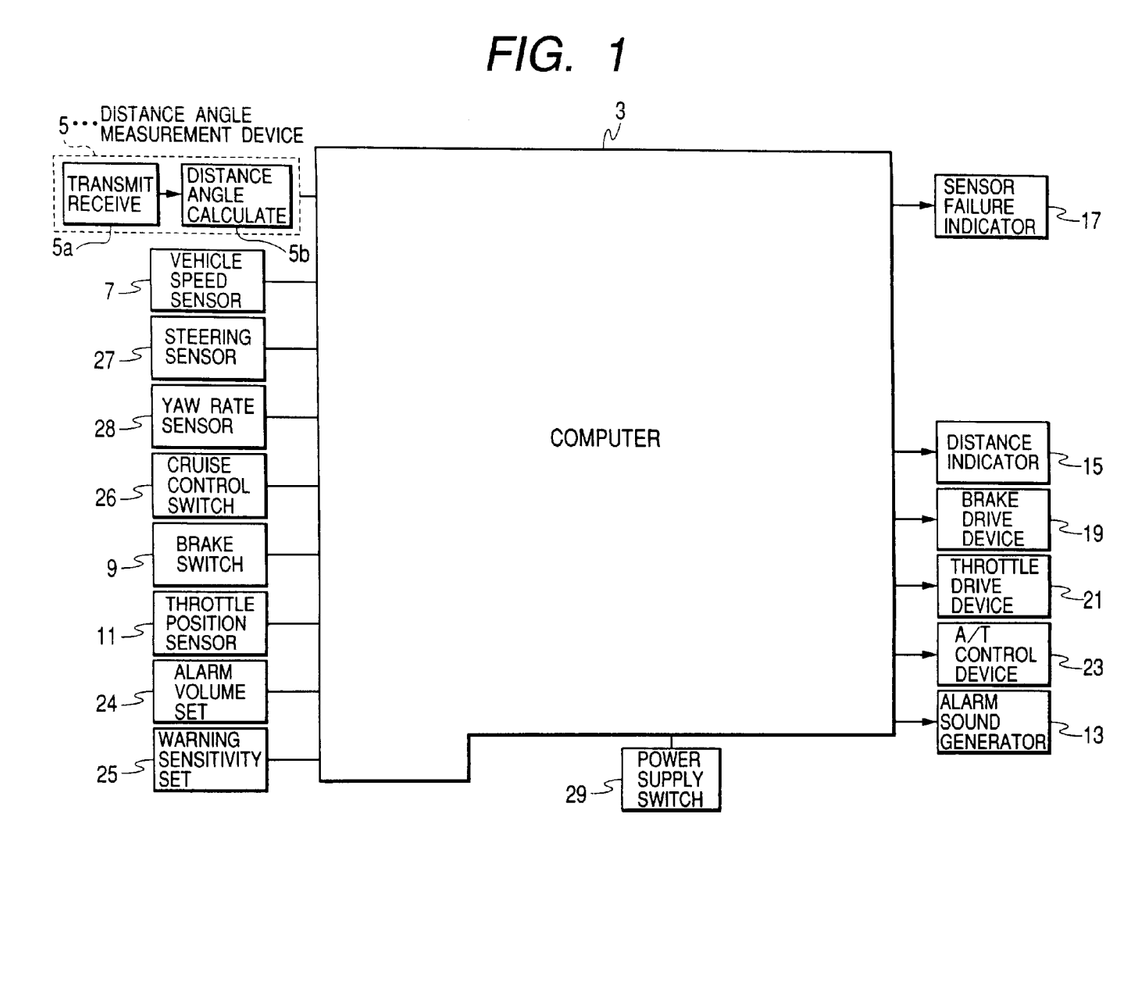
FIG. 1 is a block diagram of a vehicle control apparatus according to an embodiment of this invention.

FIG. 1 shows a vehicle control apparatus according to an embodiment of this invention. The vehicle control apparatus is mounted on a vehicle. The vehicle control apparatus alarms when an obstacle in a specified condition exists in a given angular region (a given detection area) in front of the present vehicle. The vehicle control apparatus adjusts the speed of the present vehicle in accordance with the speed of a preceding vehicle.

As shown in FIG. 1, the vehicle control apparatus includes a computer (for example, a microcomputer) 3. The computer 3 has a combination of an input/output (I/O) interface, a CPU, a ROM, and a RAM. The computer 3 operates in accordance with a program stored in the ROM. The program may be stored in the RAM. In this case, the RAM is provided with a backup device.

Alternatively, the program may be stored in a recording medium such as a floppy disk, a magneto-optical disk, a CD-ROM, or a hard disk. In this case, the computer 3 is connected with a drive for the recording medium, and the program is downloaded into the computer 3 through the drive.

The vehicle control apparatus includes a distance and angle measurement device 5, a vehicle speed sensor 7, a brake switch 9, and a throttle opening degree sensor (a throttle position sensor) 11 which are connected to the computer 3. The output signals of the devices 5, 7, 9, and 11 are inputted into the computer 3. The distance and angle measurement device 5 acts as an obstacle detection device for the present vehicle.

The vehicle control apparatus includes an alarm sound generator 13, a distance indicator 15, a sensor failure indicator 17, a brake drive device 19, a throttle drive device 21, and an automotive automatic transmission control device 23 which are connected to the computer 3. The computer 3 outputs drive signals to the devices 13, 15, 17, 19, 21, and 23.

The vehicle control apparatus includes an alarm sound volume setting device 24, an alarm sensitivity setting device 25, a cruise control switch 26, a steering sensor 27, and a yaw rate sensor 28 which are connected to the computer 3. The output signals of the devices 24, 25, 26, 27, and 28 are inputted into the computer 3. The alarm sound volume setting device 24 acts to set the volume of alarm sound. The alarm sensitivity setting device 25 acts to set the sensitivity in a warning determination process mentioned later. The steering sensor 27 detects the degree of operation of a vehicle steering wheel (not shown), that is, the steering angle in the present vehicle.

The vehicle control apparatus includes a power supply switch 29 connected to the computer 3. When the power supply switch 29 is changed to its on position, the computer 3 is powered and starts predetermined processes.

The distance and angle measurement device 5 has a transmitting and receiving portion 5a, and a distance and angle calculating portion 5b. The transmitting and receiving portion 5a emits a forward laser beam ahead of the present vehicle, and controls the forward laser beam to periodically scan a given angular region in front of the present vehicle. The given angular region corresponds to a given sectorial detection area monitored by the transmitting and receiving portion 5a. In the case where an object exists in the detection area (the given angular region), the forward laser beam encounters the object before being at least partially reflected thereby. A portion of the reflected laser beam returns to the transmitting and receiving portion 5a as an echo laser beam. The transmitting and receiving portion 5a receives the echo laser beam, and converts the echo laser beam into a corresponding electric signal. The transmitting and receiving portion 5a outputs the electric signal to the distance and angle calculating portion 5b.

The distance and angle calculating portion 5b detects the angle (the angular position) "θ" of the object in response to the output signal from the transmitting and receiving portion 5a. The distance and angle calculating portion 5b measures the time interval between the moment of the transmission of a forward laser beam and the moment of the reception of a related echo laser beam in response to the output signal from the transmitting and receiving portion 5a. The distance and angle calculating portion 5b detects the distance "r" to the object from the present vehicle on the basis of the measured time interval. The distance and angle calculating portion 5b informs the computer 3 of the angle (the angular position) "θ" of the object and the distance "r" thereto. In general, since the object is smaller than the cross-sectional area of the forward laser beam and is scanned thereby, the distance and angle information notified from the distance and angle calculating portion 5b to the computer 3 contains information of the size and shape of the object. Objects detected by the distance and angle measurement device 5 include obstacles.

The laser beam may be replaced by a radio wave beam, a millimeter wave beam, or an ultrasonic beam. The scanning may be implemented by controlling the echo beam reception by the transmitting and receiving portion 5a.

The computer 3 executes a warning determination process designed to generate an alarm in the case where an obstacle remains in a specified area during longer than a prescribed time interval. The obstacle corresponds to, for example, a preceding vehicle, a stationary vehicle, a guardrail on a road side, or a prop on a road side. Simultaneously with the execution of the warning determination process, the computer 3 operates to control the distance between the present vehicle and a preceding vehicle. Specifically, during the inter-vehicle distance control, the computer 3 controls the brake drive device 19, the throttle drive device 21, and the automatic transmission control device 23 and thereby adjusts the speed of the present vehicle in accordance with conditions of the preceding vehicle.

Figure 2:
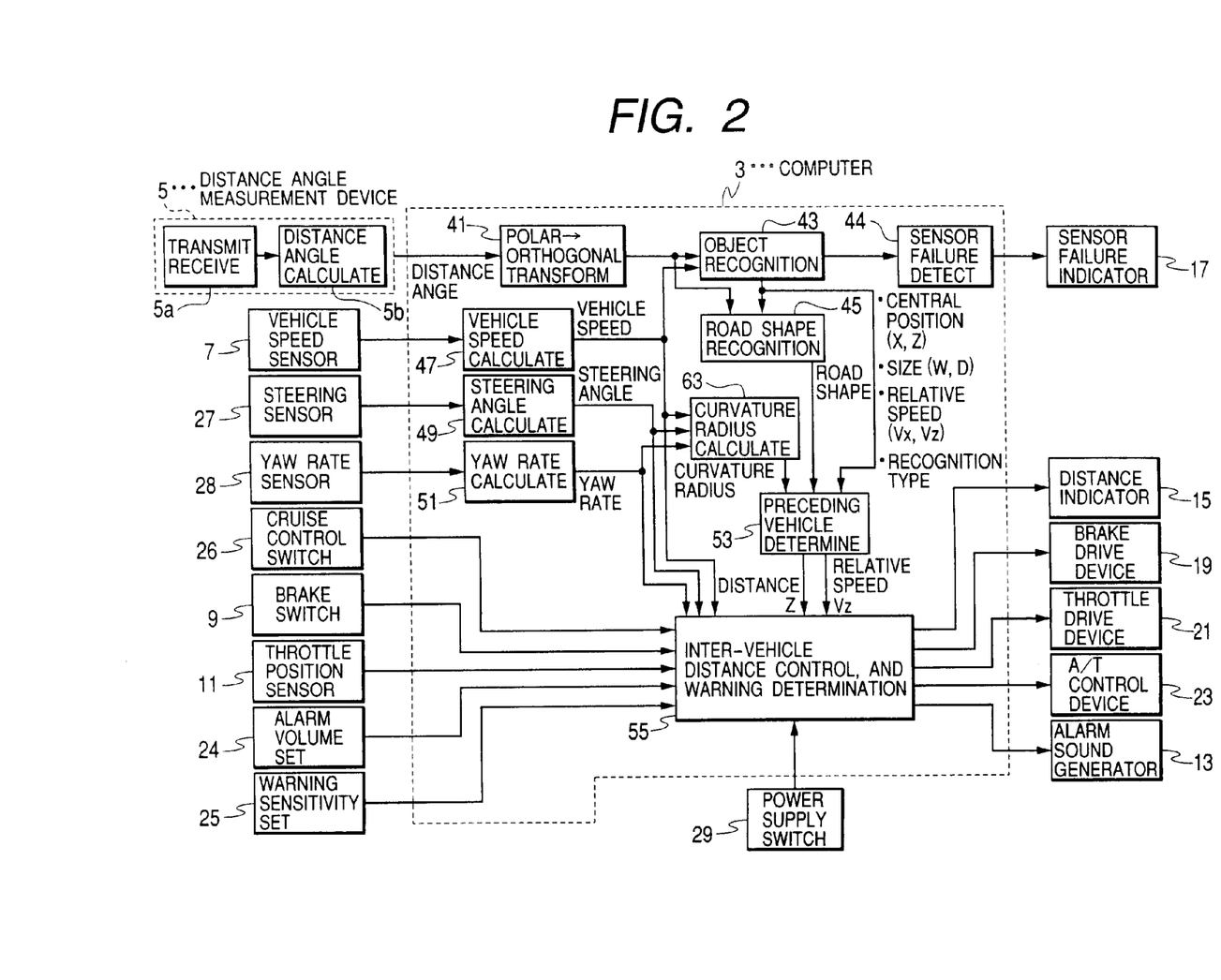
FIG. 2 is an operation flow diagram of a computer in FIG. 1.

FIG. 2 shows the flow of operation of the computer 3 rather than the hardware structure thereof. With reference to FIG. 2, a coordinate transformation block 41 receives, from the distance and angle calculating portion 5b in the distance and angle measurement device 5, measurement data representing a distance "r" and an angle "θ" concerning each detected object. The coordinate transformation block 41 converts the distance and angle data of polar coordinates into measurement data of X-Z orthogonal coordinates designed so that the origin (0, 0) coincides with the center of a laser radar formed by the distance and angle measurement device 5, and the X axis and the Z axis coincide with a width-wise direction and a longitudinal forward direction of the present vehicle respectively. The coordinate transformation block 41 outputs the orthogonal-coordinate measurement data to an object recognition block 43 and a road shape recognition block 45.

A vehicle speed calculation block 47 computes the speed V of the present vehicle on the basis of the output signal from the vehicle speed sensor 7.

The object recognition block 43 calculates the central position (X, Z) and size (W, D) of each detected object on the basis of the orthogonal-coordinate measurement data. Here, W denotes a transverse width, and D denotes a depth. The object recognition block 43 calculates the speed (Vx, Vz) of the object relative to the present vehicle from time-domain movement of the central position (X, Z) thereof. The object recognition block 43 is informed of the speed V of the present vehicle by the vehicle speed calculation block 47. The object recognition block 43 determines whether or not each detected object is stationary or moving on the basis of the vehicle speed V and the relative speed (Vx, Vz). One or more which may affect the travel of the present vehicle are selected from among detected objects on the basis of the stationary-moving determination results and the central positions of the detected objects. Information of the distance to each selected object is transferred to the distance indicator 15 so that the distance to the selected object is indicated by the distance indicator 15. A model of an object which is represented by central position data, size data, relative-speed data, and stationary-moving determination result data (recognition type data) will be called a target model.

A sensor failure detection block 44 receives the output data (the object-recognition result data) from the object recognition block 43 which represent the object parameters calculated thereby. The sensor failure detection block 44 determines whether the output data from the object recognition block 43 are in a normal range or an abnormal range. When the output data from the object recognition block 43 are in the abnormal range, the sensor failure detection block 44 activates the sensor failure indicator 17 to indicate a failure.

The road shape recognition block 45 receives the object-recognition result data from the object recognition block 43. The road shape recognition block 45 recognizes a road shape on the basis of the orthogonal-coordinate measurement data and the object-recognition result data. The recognition of a road shape will be described later in more detail. The road shape recognition block 45 outputs data (road shape data) to a preceding-vehicle determination block 53 which represent the result of the road shape recognition.

A steering angle calculation block 49 computes the steering angle regarding the present vehicle on the basis of the output signal from the steering sensor 27. A yaw rate calculation block 51 computes the yaw rate of the present vehicle on the basis of the output signal from the yaw rate sensor 28.

A curvature-radius calculation block 63 is informed of the vehicle speed V by the vehicle speed calculation block 47. The curvature-radius calculation block 63 is informed of the computed steering angle by the steering angle calculation block 49. The curvature-radius calculation block 63 is informed of the computed yaw rate by the yaw rate calculation block 51. The curvature-radius calculation block 63 computes the radius R of curvature of the road on the basis of the vehicle speed V, the steering angle, and the yaw rate.

The preceding-vehicle determination block 53 is informed of the computed curvature radius R by the curvature-radius calculation block 63. The preceding-vehicle determination block 53 is informed of the stationary-moving determination results, the object central positions (X, Z), the object sizes (W, D), and the relative speeds (Vx, Vz) by the object recognition block 43. The preceding-vehicle determination block 53 receives the road shape data from the road shape recognition block 45. The preceding-vehicle determination block 53 determines or selects a preceding vehicle from among the detected objects on the basis of the curvature radius R, the stationary-moving determination results, the object central positions (X, Z), the object sizes (W, D), the relative speeds (Vx, Vz), and the road shape data. The preceding-vehicle determination block 53 calculates the distance Z to the preceding vehicle from the present vehicle, and the speed Vz of the preceding vehicle relative to the present vehicle.

An inter-vehicle distance control and warning determination block 55 is informed of the distance Z to the preceding vehicle and the relative speed Vz by the preceding-vehicle determination block 53. The inter-vehicle distance control and warning determination block 55 is informed of the vehicle speed V by the vehicle speed calculation block 47. The inter-vehicle distance control and warning determination block 55 computes the acceleration of the preceding vehicle from the relative speed Vz and the vehicle speed V. The inter-vehicle distance control and warning determination block 55 is informed of the object central positions (X, Z), the object widths D, and the stationary-moving determination results by the object recognition block 43. The inter-vehicle distance control and warning determination block 55 detects setting conditions of the cruise control switch 26 from the output signal thereof. The inter-vehicle distance control and warning determination block 55 detects the state of the brake switch 9 from the output signal thereof. The state of the brake switch 9 represents whether or not a vehicle brake pedal is depressed. The inter-vehicle distance control and warning determination block 55 is informed of the degree of opening through a vehicular engine throttle valve by the throttle opening degree sensor 11. The inter-vehicle distance control and warning determination block 55 is informed of the alarm sensitivity setting value by the alarm sensitivity setting device 25. The inter-vehicle distance control and warning determination block 55 implements a warning determination and a cruise determination in response to the distance Z to the preceding vehicle, the relative speed Vz, the vehicle speed V, the preceding-vehicle acceleration, the object central positions (X, Z), the object widths D, the stationary-moving determination results, the setting conditions of the cruise control switch 26, the state of the brake switch 9, the throttle opening degree, and the alarm sensitivity setting value. During the warning determination, the inter-vehicle distance control and warning determination block 55 determines whether or not an alarm should be generated. During the cruise determination, the inter-vehicle distance control and warning determination block 55 determines the contents of vehicle speed control. When it is determined that an alarm should be generated, the inter-vehicle distance control and warning determination block 55 outputs an alarm generation signal to the alarm sound generator 13. In this case, the alarm sound generator 13 produces alarm sound. The inter-vehicle distance control and warning determination block 55 adjusts the level of the alarm sound in accordance with the sound volume set by the alarm sound volume setting device 24. In the case where the cruise determination corresponds to the execution of cruise control, the inter-vehicle distance control and warning determination block 55 outputs suitable control signals to the automotive automatic transmission control device 23, the brake drive device 19, and the throttle drive device 21. During the execution of warning control and cruise control, the inter-vehicle distance control and warning determination block 55 outputs an indication signal to the distance indicator 15 to inform the vehicle's driver of distance-related conditions.

Figure 3:
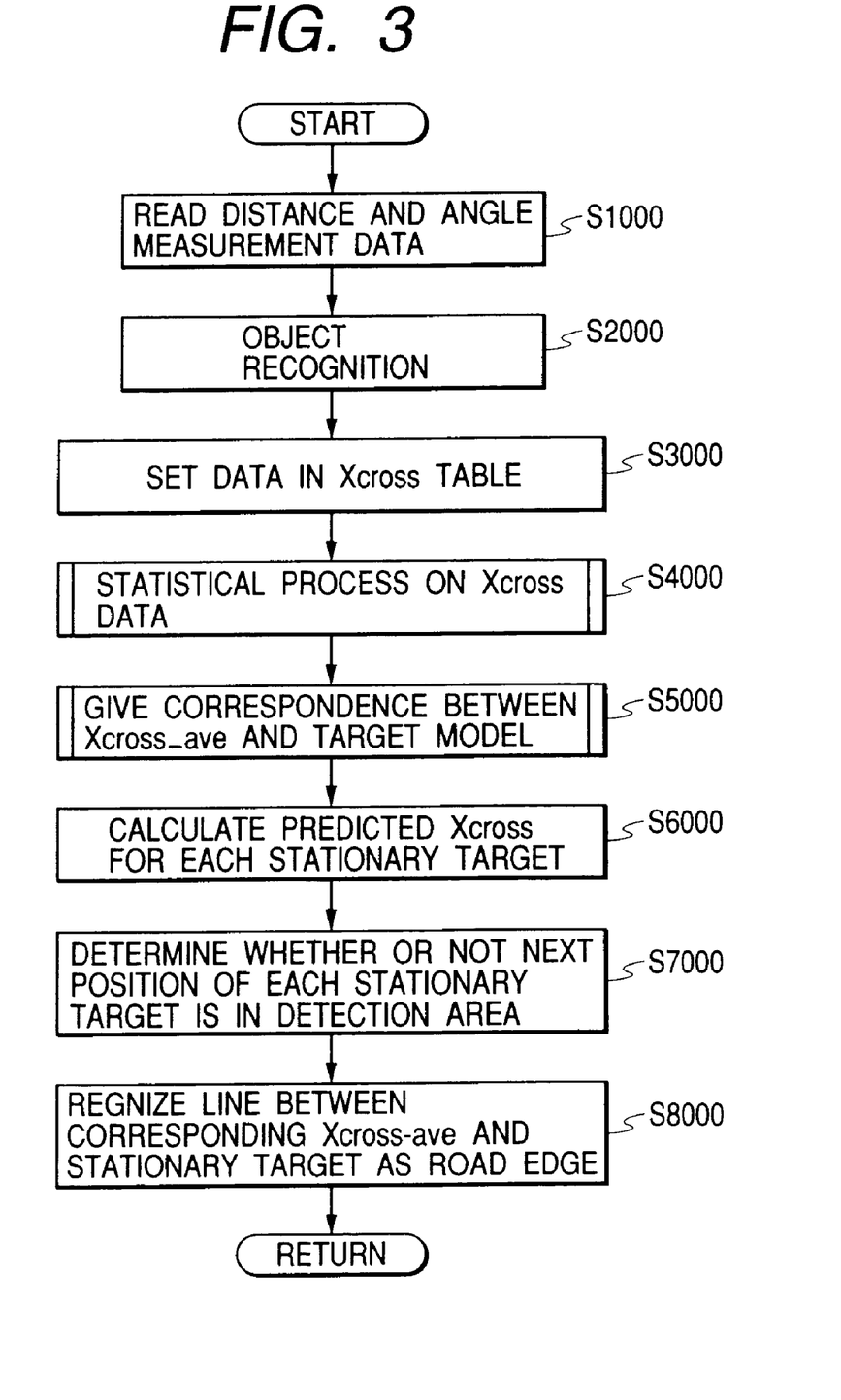
FIG. 3 is a flowchart of a segment of a program for the computer in FIG. 1.

As previously mentioned, the computer 3 operates in accordance with a program stored in its internal ROM or RAM. FIG. 3 is a flowchart of a segment of the program for the computer 3 which relates to the recognition of a road shape. The program segment in FIG. 3 is repetitively executed at a period corresponding to the period of the scanning implemented by the distance and angle measurement device 5.

As shown in FIG. 3, a first step S1000 of the program segment receives distance and angle measurement data from the distance and angle measurement device 5 for one period of the scanning. In other words, the step S1000 receives distance and angle measurement data corresponding to one frame. The scanning period is equal to, for example, 100 msec.

A step S2000 following the step S1000 converts the distance and angle data of polar coordinates into measurement data of X-Z orthogonal coordinates. The step S2000 corresponds to the object recognition block 43, and implements the previously-mentioned object recognition on the basis of the orthogonal-coordinate measurement data. Each object recognized or detected by the step S2000 will be called a target or a target model.

The step S2000 is followed by a sequence of steps and blocks S3000–S8000 which correspond to the road shape recognition block 45 in FIG. 2.

Figure 6:
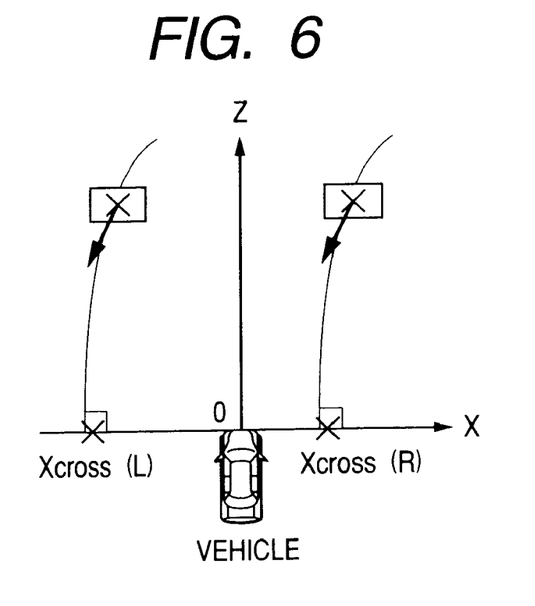
FIG. 6 is a diagram of a vehicle, targets, and transverse positions Xcross (R) and Xcross (L).

The step S3000 subsequent to the step S2000 sets data in an Xcross table. Here, Xcross denotes the transverse position relative to the present vehicle through which a delineator (a stationary target) passes, that is, the X coordinate of the point of intersection between the X axis and the locus (the trajectory) of the delineator as shown in FIG. 6. The transverse position Xcross of each target has been calculated by the step S6000 during the immediately preceding execution cycle of the program segment. The positive sign of a transverse position Xcross corresponds to the right-hand side of the road, while the negative sign thereof corresponds to the left-hand side of the road. A transverse position corresponding to the right-hand side of the road is denoted by Xcross (R). A transverse position corresponding to the left-hand side of the road is denoted by Xcross (L). The Xcross table has an (R) section and an (L) section. Data pieces representing up to five transverse positions Xcross (R) can be set in the (R) section of the Xcross table. Data pieces representing up to five transverse positions Xcross (L) can be set in the (L) section of the Xcross table. Regarding only each stationary target which has moved out of the detection area related to the distance and angle measurement device 5 and has been lost, the step S3000 sets, in the corresponding one of the (R) and (L) sections of the Xcross table, a data piece representative of a predicted transverse position Xcross which was calculated by the step S6000 during the immediately preceding execution cycle of the program segment. In the case where each of the (R) and (L) sections of the Xcross table is fully occupied by data pieces, a data piece representative of the oldest delineator (the oldest stationary target) is erased from the section of the Xcross table when a new data piece is set therein. Preferably, an old data piece corresponding to a moment at least 30-seconds before the present moment is erased from the Xcross table regardless of overflow conditions of the Xcross table.

The block S4000 following the step S3000 subjects the data in the Xcross table to a statistical process, thereby calculating an average transverse position (a mean transverse position) Xcross_ave (R) among the transverse positions Xcross (R), and an average transverse position (a mean transverse position) Xcross_ave (L) among the transverse positions Xcross (L).

Figure 4:
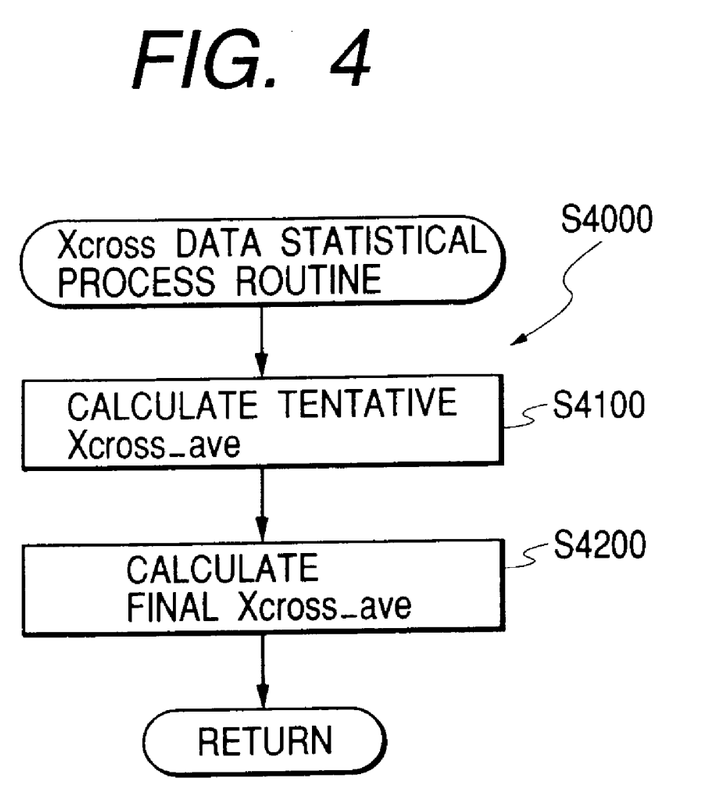
FIG. 4 is a flowchart of a block in FIG. 3.

FIG. 4 shows the details of the block S4000. As shown in FIG. 4, the block S4000 includes a sequence of steps S4100 and S4200. The step S4100 which follows the step S3000 (see FIG. 3) calculates a first (R) average transverse position among the transverse positions Xcross (R) through a simple mean process. The step S4100 calculates a first (L) average transverse position among the transverse positions Xcross (L) through the simple mean process. The step S4200 subsequent to the step S4100 searches the transverse positions Xcross (R) for an ineffective one or ineffective ones which differ from the first (R) average transverse position by at least 1.0 m. The transverse positions Xcross (R) except the ineffective one or the ineffective ones are regarded as effective transverse positions Xcross (R). When there are three or more effective transverse positions Xcross (R), the step S4200 calculates a second (R) average transverse position among the effective transverse positions Xcross (R) and sets the second (R) average transverse position as the final (R) average transverse position, that is, the average transverse position Xcross_ave (R). Otherwise, the step S4200 determines that the calculation of the average transverse position Xcross_ave (R) is impossible. Similarly, the step S4200 calculates the average transverse position Xcross_ave (L), and also determines whether or not the calculation of the average transverse position Xcross_ave (L) is impossible. The step S4200 is followed by the block S5000 (see FIG. 3).

With reference back to FIG. 3, the block S5000 following the block S4000 gives the correspondences among the average transverse position Xcross_ave (R) provided by the block S4000, the average transverse position Xcross_ave (L) provided by the block S4000, and the target models provided by the step S2000. When the block S5000 finds a target suitably corresponding to the average transverse position Xcross_ave (R), the block S5000 recognizes a line connecting them as the right-hand edge of the road. When the block S5000 finds a target suitably corresponding to the average transverse position Xcross_ave (L), the block S5000 recognizes a line connecting them as the left-hand edge of the road.

Figure 5:
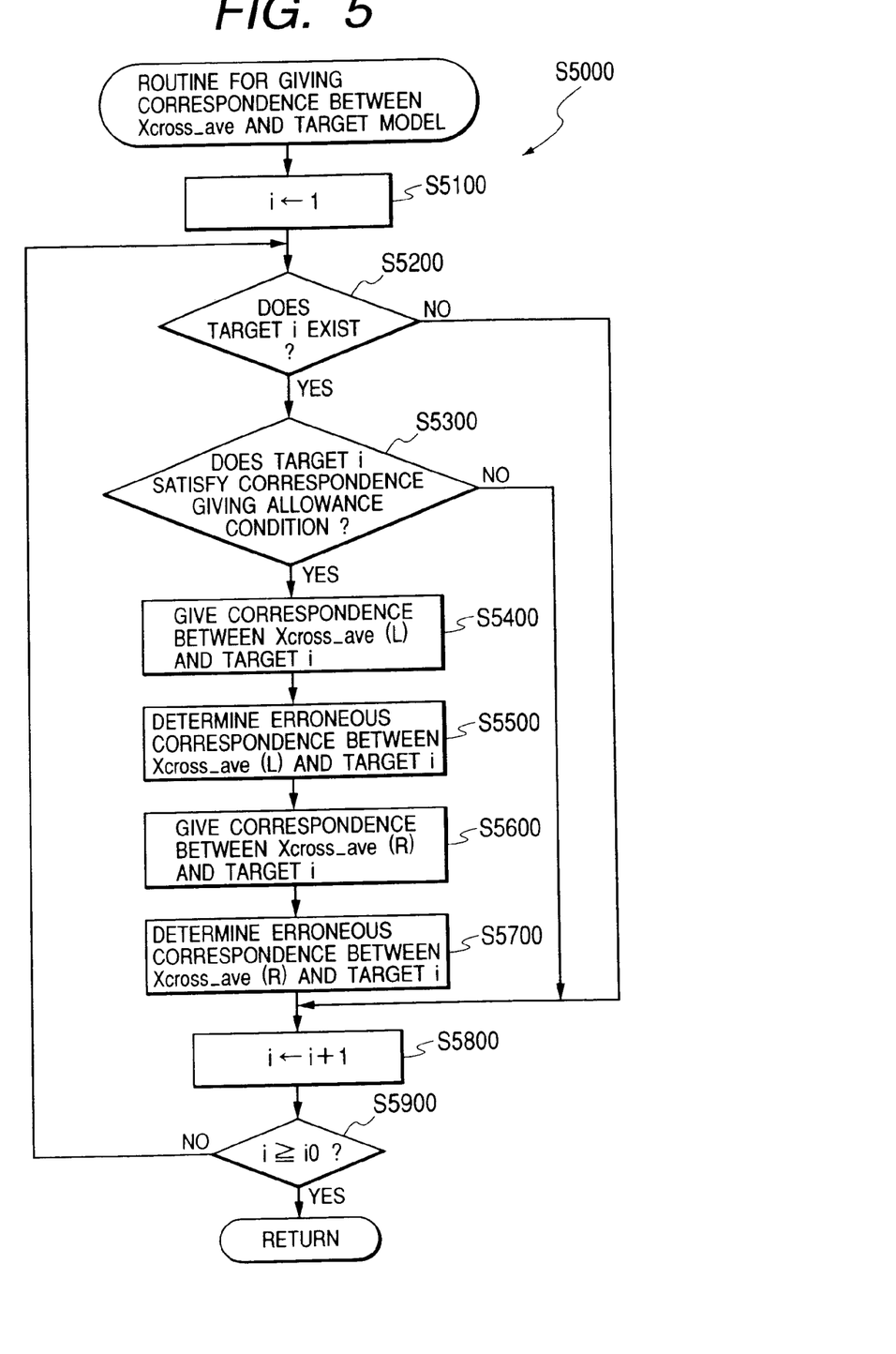
FIG. 5 is a flowchart of another block in FIG. 3.

FIG. 5 shows the details of the block S5000. As shown in FIG. 5, the block S5000 includes steps S5100-S5900. The step S5100 which follows the block S4000 (see FIG. 3) initializes the target identification number "i" to "1". Serial numbers starting from "1" are previously assigned to the targets given by the step S2000 (see FIG. 3), respectively. A target having an identification number "i" will be referred to as a target "i". After the step S5100, the program advances to the step S5200.

The step S5200 determines whether or not the target "i" exists. When the target "i" exists, the program advances from the step S5200 to the step S5300. Otherwise, the program jumps from the step S5200 to the step S5800.

The step S5300 determines whether or not the target "i" satisfies conditions of allowance of giving correspondence. When the target "i" satisfies the allowance conditions, the program advances from the step S5300 to the step S5400. Otherwise, the program jumps from the step S5300 to the step S5800. The allowance conditions are as follows.

(1) The target "i" is stationary.
(2) ① During the normal travel of the present vehicle, the distance Z to the target "i" is equal to or less than 100 m.
② If there is a chance that the present vehicle is changing the lane, the distance Z to the target "i" is equal to or less than 50 m.

Regarding the condition ② in the above-indicated section (2), the step S5300 implements a first decision (a) as to whether or not the steering angle in the present vehicle is changed (or returned) to more than a predetermined reference degree on the basis of a time-domain variation in the relative speed between a stationary target and the present vehicle, and a second decision (b) as to whether or not the point of intersection between the road edge and the X axis changes on the basis of a time-domain variation in the transverse position Xcross of the target "i". The step S5300 determines whether or not there is a chance of the lane change by the present vehicle on the basis of the results of the first and second decisions (a) and (b).

Figure 7:
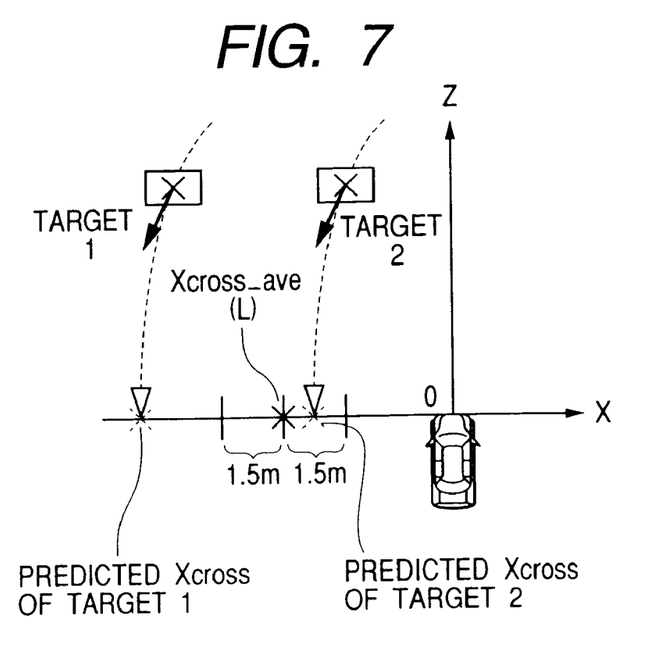
FIG. 7 is a diagram of a vehicle, targets, and transverse positions Xcross related to the targets.

The step S5400 calculates the absolute value of the difference between the average transverse position Xcross_ave (L) and the predicted transverse position Xcross of the target "i". The step S5400 determines whether or not the calculated absolute difference is smaller than 1.5 m. When the calculated absolute difference is smaller than 1.5 m, the step S5400 decides that the average transverse position Xcross_ave (L) and the predicted transverse position Xcross of the target "i" correspond to each other, that is, the average transverse position Xcross_ave (L) and the target "i" correspond to each other. Otherwise, the step S5400 decides that the average transverse position Xcross_ave (L) and the predicted transverse position Xcross of the target "i" do not correspond to each other, that is, the average transverse position Xcross_ave (L) and the target "i" do not correspond to each other. The step S5400 prevents the correspondence giving process from being adversely affected by data available immediately before the lane change and an abrupt change of the road edge which is involved in, for example, an uphill road. In FIG. 7, the predicted transverse position Xcross of the target 2 corresponds to the average transverse position Xcross_ave (L), while the predicted transverse position Xcross of the target 1 does not.

The step S5500 following the step S5400 determines whether or not the decided correspondence between the average transverse position Xcross_ave (L) and the predicted transverse position Xcross of the target "i" (the decided correspondence between the average transverse position Xcross_ave (L) and the target "i") is erroneous. The step S5500 is designed in view of the following fact. In the case where the present vehicle is entering a road curve and the steering angle in the present vehicle is changed accordingly, there is a chance that a target actually on the right-hand side of the road is erroneously decided to be in correspondence with the average transverse position Xcross_ave (L). When it is determined that the decided correspondence between the average transverse position Xcross_ave (L) and the predicted transverse position Xcross of the target "i" is erroneous, the step S5500 cancels the decided correspondence and newly decides that the average transverse position Xcross_ave (L) and the predicted transverse position Xcross of the target "i" do not correspond to each other (the average transverse position Xcross_ave (L) and the target "i" do not correspond to each other).

The determination by the step S5500 will be described below in more detail. In consideration of conditions of a road curve which have occurred for 5 seconds past, a determination is made as to whether or not there is a chance that the target "i" corresponds to the average transverse position Xcross_ave (R). The conditions of the road curve use a curvature radius R estimated from a stationary target. A circle is calculated. The circle passes through the center of the stationary target. A tangent vector on the circle is equal in direction to the relative speed vector for the stationary target. When it is assumed that the center of the circle is on the X axis, the circle intersects with the X axis at a right angle. Accordingly, in this case, the circle is uniquely decided.

Figures 8, 9, 10:
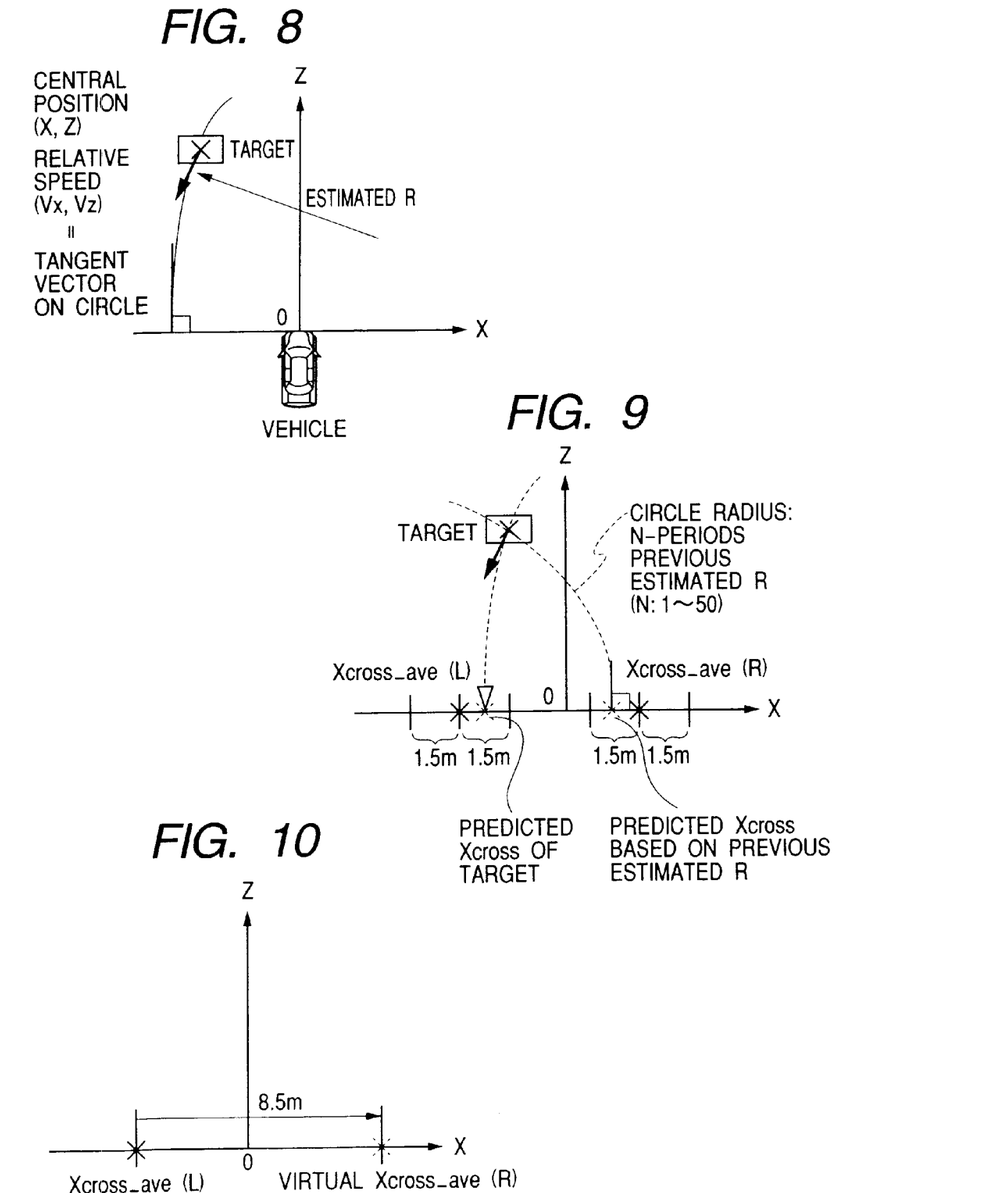
FIG. 8 is a diagram of a vehicle, a stationary target, and an estimated road curvature radius.
FIG. 9 is a diagram of a vehicle, a target, average transverse positions Xcross_ave (R) and Xcross_ave (L), and an estimated road curvature radius R.
FIG. 10 is a diagram of a real average transverse position Xcross_ave (L) and a virtual average transverse position Xcross_ave (R).

Specifically, as shown in FIG. 8, a circle is calculated which passes through the center of a stationary target, and which intersects with the X axis at a right angle. On the supposition that $|X|<<|R|, Z$, a parabola is approximate to the circle and hence the circle is expressed by the following equation.

$$X = Xo + (Z-Zo)^2/2R \quad (1)$$

Since the tangent vector on the circle is equal in direction to the relative speed vector for the stationary target, the following equation is available.

$$dX/dZ = Vx/Vz \quad (2)$$

From the equations (1) and (2), the radius R is given as follows.

$$R = (Z-Zo) \cdot Vz/Vx \quad (3)$$

In the case where there are a plurality of stationary targets, estimated radii R are calculated for the stationary targets respectively and a mean of the estimated radii R is used as a final radius.

Subsequently, a determination is made as to whether or not the target "i" corresponds to the average transverse position Xcross_ave (R) by using a previous estimated radius R available at a moment which precedes the present moment by a time corresponding to N periods of the scanning where N denotes a natural number between 1 and 50. One period of the scanning is equal to, for example, 100 msec. As shown in FIG. 9, a circle is calculated which has a radius equal to the previous estimated radius R. The circle passes through the center of the target "i", and intersects with the X axis at a right angle. The circle is expressed by the following equation.

$$X = Xo + (Z-Zo) \cdot Vx/2Vz \quad (4)$$

When Z=0, the equation (4) changes into the following version.

$$X = Xo - Zo \cdot Vx/2Vz \quad (5)$$

The point of intersection between the circle and the X axis is defined as a predicted transverse position PXcross given by the following equation.

$$PXcross = Xo - Zo \cdot Vx/2Vz \quad (6)$$

Provided that a below-indicated relation (7) is satisfied at least once during 5 seconds past, it is decided that the target "i" may correspond to the average transverse position Xcross_ave (R). The relation (7) is expressed as follows.

$$|PXcross - Xcross\_ave (R)| < 1.5 \text{ m} \quad (7)$$

In this case, the decided correspondence between the target "i" and the average transverse position Xcross_ave (L) is canceled. Thus, it is newly decided that the target "i" and the average transverse position Xcross_ave (L) do not correspond to each other.

In the case where only a delineator or delineators on the left-hand side of the road are detected, the average transverse position Xcross_ave (R) is unavailable. In this case, as shown in FIG. 10, a position on the X axis which is separate from the average transverse position Xcross_ave (L) by a predetermined distance (for example, 8.5 m) is used as a virtual average transverse position Xcross_ave (R). A distance of 8.5 m corresponds to the width of two lanes plus the width of road shoulders.

The step S5600 following the step S5500 is similar in contents to the step S5400 except that the step S5600 decides the correspondence between the target "i" and the average transverse position Xcross_ave (R) rather than the correspondence between the target "i" and the average transverse position Xcross_ave (L). The step S5700 subsequent to the step S5600 is similar in contents to the step S5500 except that the step S5700 implements an error-related determination about the correspondence between the target "i" and the average transverse position Xcross_ave (R) rather than the correspondence between the target "i" and the average transverse position Xcross_ave (L).

Specifically, the step S5600 calculates the absolute value of the difference between the average transverse position Xcross_ave (R) and the predicted transverse position Xcross of the target "i". The step S5600 determines whether or not the calculated absolute difference is smaller than 1.5 m. When the calculated absolute difference is smaller than 1.5 m, the step S5600 decides that the average transverse position Xcross_ave (R) and the target "i" correspond to each other. Otherwise, the step S5600 decides that the average transverse position Xcross_ave (R) and the target "i" do not correspond to each other. The step S5700 determines whether or not the decided correspondence between the average transverse position Xcross_ave (R) and the target "i" is erroneous. After the step S5700, the program advances to the step S5800.

The step S5800 increments the target identification number "i" by "1" according to the statement as "i=i+1".

The step S5900 following the step S5800 compares the target identification number "i" with a maximum number "i0". When the target identification number "i" is smaller than the maximum number "i0", the program returns from the step S5900 to the step S5200. Otherwise, the program advances from the step S5900 to the step S6000 (see FIG. 3).

Figure 11:
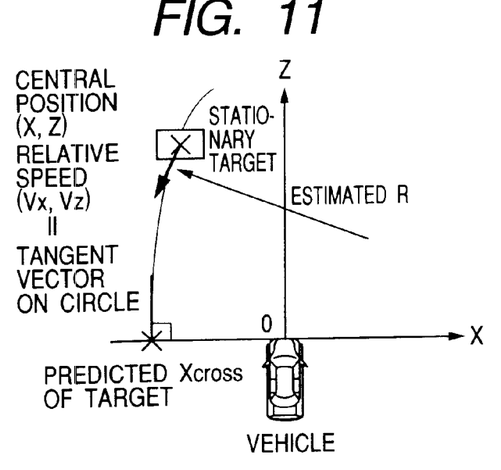
FIG. 11 is a diagram of a vehicle, a stationary target, an estimated road curvature radius R, and a predicted transverse position Xcross of the stationary target.

With reference back to FIG. 3, the step S6000 calculates the predicted transverse positions Xcross of the stationary targets, respectively. As shown in FIG. 11, a circle is calculated for each of the stationary targets. The circle passes through the center of the related stationary target. A tangent vector on the circle is equal in direction to the relative speed vector for the related stationary target. When it is assumed that the center of the circle is on the X axis, the circle intersects with the X axis at a right angle. Accordingly, in this case, the circle is uniquely decided. The point of intersection between the circle and the X axis is defined as the predicted transverse position Xcross of the related stationary target. The predicted transverse positions Xcross calculated by the step S6000 will be used by the step S3000 in the next execution cycle of the program segment. Specifically, during the next execution cycle of the program segment, the Xcross table is loaded by the step S3000 with each data piece representative of the predicted transverse position Xcross of a stationary target being lost and moving out of the detection area related to the distance and angle measurement device 5.

The step S7000 subsequent to the step S6000 estimates next positions (new positions or future positions) of the stationary targets. The step S7000 determines whether or not each of the stationary targets will remain within the detection area in the next execution cycle of the program segment by referring to the estimated next position of the stationary target. Specifically, the step S7000 calculates a next position (Xnext, Znext) of each of the stationary targets from the present position (Xo, Zo) thereof, the scanning period $\Delta T$, and the relative speed (Vx, Vz) thereof according to the following equations.

$$X\text{next} = Xo + Vx \cdot \Delta T$$

$$Z\text{next} = Zo + Vz \cdot \Delta T$$

Then, the step S7000 determines whether or not the calculated next position (Xnext, Znext) is in the detection area. The detection area corresponds to an angular range of, for example, 20 degrees. A stationary target is now considered whose next position (Xnext, Znext) is determined to be outside the detection area by the step S7000, and which is not detected at the next execution cycle of the program segment. It is decided that such a stationary target has actually moved out of the detection area. Information of this stationary target is used by the step S3000.

Figure 12:
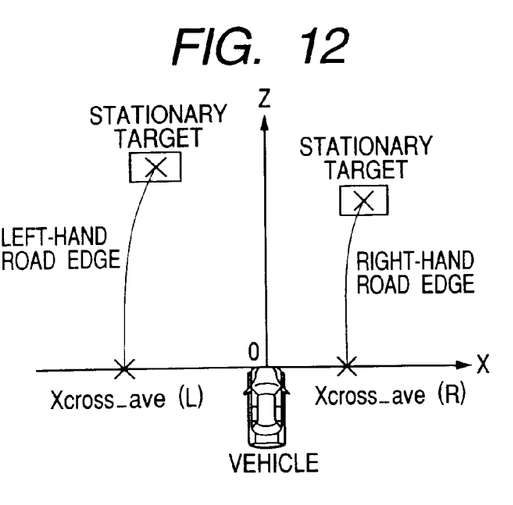
FIG. 12 is a diagram of a vehicle, stationary targets, average transverse positions Xcross_ave (R) and Xcross_ave (L), and recognized road edges.
Figure 13:
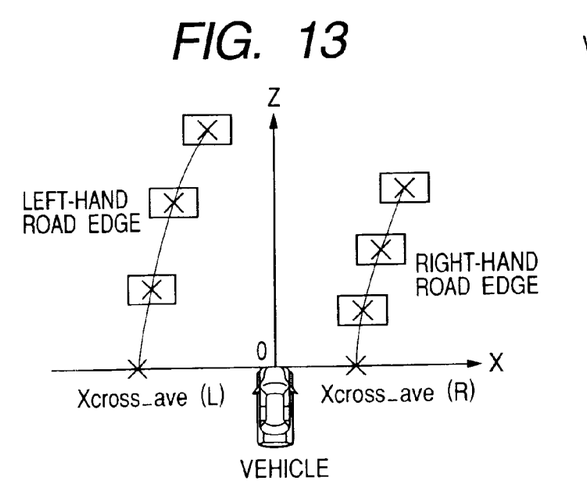
FIG. 13 is a diagram of a vehicle, stationary targets, average transverse positions Xcross_ave (R) and Xcross_ave (L), and recognized road edges.

The step S8000 following the step S7000 refers to each correspondence between a stationary target and the average transverse position Xcross_ave (R), and each correspondence between a stationary target and the average transverse position Xcross_ave (L) which are decided by the block S5000. As shown in FIG. 12, the step S8000 recognizes a line connecting the average transverse position Xcross_ave (R) and the central position of the corresponding target to be the right-hand road edge. In addition, the step S8000 recognizes a line connecting the average transverse position Xcross_ave (L) and the central position of the corresponding target to be the left-hand road edge. For example, the connecting lines are straight, curved, or parabolic. In FIG. 3, there are three stationary targets corresponding to the average transverse position Xcross_ave (R), and three stationary targets corresponding to the average transverse position Xcross_ave (L). In this case, lines connecting the average transverse position Xcross_ave (R) and the corresponding stationary targets which are given by interpolation are recognized as the right-hand road edge. Similarly, lines connecting the average transverse position Xcross_ave (L) and the corresponding stationary targets which are given by interpolation are recognized as the left-hand road edge. The recognized right-hand and left-hand road edges may be denoted by interpolation-based curved lines. After the step S8000, the current execution cycle of the program segment ends.

In the embodiment of this invention, the distance and angle measurement device 5 corresponds to radar means while the coordinate transformation block 41, the object recognition block 43, and the road shape recognition block 45 provided by the computer 3 correspond to recognizing means. In addition, the coordinate transformation block 41 and the object recognition block 43 correspond to object recognizing means. The road shape recognition block 45 corresponds to average position calculating and memorizing means, correspondence determining means, erroneous correspondence determining means, and road edge recognizing means.

The embodiment of this invention has advantages as follows. In the case where the present vehicle continues to travel along the same lane and the number of lanes in the road remains constant, the point of intersection between the X axis and the right-hand road edge and the point of intersection between the X axis and the left-hand road edge remain substantially fixed as viewed from the present vehicle. Thus, according to the road shape recognition in the embodiment of this invention, each road edge can be suitably recognized even when there is only one detected delineator (one detected stationary target). A margin of a certain degree is provided in the conditions of giving correspondences among stationary targets and average transverse positions Xcross_ave (R) and Xcross_ave (L). Therefore, even in the case where the present vehicle travels along a curved road whose curvature radius gradually changes, road edges can be stably recognized. The reason for the stable recognition is as follows. Relative speed vectors are used in calculating transverse positions Xcross. In the case where the present vehicle travels along a curved road whose curvature radius gradually changes, relative speed vectors also gradually vary. Providing the margin of the certain degree enables such variations in the relative speed vectors to be suitably considered.

In the embodiment of this invention, road edges can be recognized at every moment. When the steering operation by the vehicle's driver fluctuates, relative speed vectors also fluctuate. Even in such a case, road edges can be suitably recognized since average transverse positions Xcross_ave (R) and Xcross_ave (L) are used and only stationary targets corresponding thereto are selected and used.

A determination about a preceding vehicle is executed on the basis of such suitably recognized road shapes. Inter-vehicle distance control and warning control are implemented in response to the result of the determination about a preceding vehicle. Thus, the inter-vehicle distance control and the warning control can be suitably executed.

The embodiment of this invention may be modified as follows.

(1) In the case where the block S5000 determines that there are a plurality of stationary targets corresponding to the average transverse positions Xcross_ave (R) or Xcross_ave (L), the step S8000 recognizes a related road edge in consideration of all the corresponding stationary targets. When there is only one corresponding stationary target for each of the right-hand and left-hand road sides, both road edges can be recognized. When there are a plurality of corresponding stationary targets, all of them are used. This design provides an increased recognition accuracy. In the case where only one of two road edges is recognized, the other road edge may be detected in view of the road width.

(2) The numerical values for the determinations of the various types are indicated regarding the embodiment of this invention. The numerical values are merely examples. The numerical values may be changed so that only accurate data will be used. In this case, a high recognition accuracy is available. As the number of pieces of used data decreases, the number of opportunities for road shape recognition also decreases. The number of usable data pieces may be increased to increase the number of opportunities for road shape recognition. The numerical values may be changed depending on application conditions.

(3) In the embodiment of this invention, the distance and angle measurement device 5 which employs the laser beam is used as radar means. The distance and angle measurement device 5 may be modified to use a millimeter wave beam. In the case where the radar means uses a Doppler radar or an FMCW radar employing a millimeter wave beam, information of a distance to a preceding vehicle and information of a relative speed of the preceding vehicle are simultaneously derived from an echo wave beam (a return wave beam). Thus, in this case, it is unnecessary to execute a step of calculating a relative speed from distance information.

What is claimed is:

1. A method of applying a transmission wave to a predetermined angular range in a width-wise direction of a vehicle, and recognizing a shape of a road extending ahead of the vehicle on the basis of a reflected wave which results from reflection of the transmission wave, the method comprising the steps of:

detecting a position of an object and a relative speed of the object on the basis of the reflected wave;

determining whether the object is moving or stationary on the basis of the detected relative speed of the object and a speed of the vehicle;

for at least one of right-hand and left-hand sides of the vehicle, calculating and memorizing a vehicle width-wise direction position where a stationary object effective for road-shape recognition passes through the related side of the vehicle on the basis of the detected position of the object and a result of determining whether the object is moving or stationary; and recognizing a line connecting the memorized vehicle width wise direction position and the detected position of the currently handled object corresponding to the effective stationary object as a road edge.

2. A method as recited in claim 1, further comprising the steps of:

calculating and memorizing an average vehicle width-wise direction position among the calculated vehicle width-wise direction positions; and using the average vehicle width-wise direction position in the road edge recognition.

3. An apparatus for recognizing a road shape, comprising:

radar means for applying a transmission wave to a predetermined angular range in a width-wise direction of a vehicle, and detecting a position of an object on the basis of a reflected wave which results from reflection of the transmission wave; and recognizing means for recognizing a shape of a road extending ahead of the vehicle on the basis of a result of detection by the radar means;

wherein the recognizing means comprises:

1) object recognizing means for detecting a position of the object and a relative speed of the object on the basis of the result of detection by the radar means, and for determining whether the object is moving or stationary on the basis of the detected relative speed of the object and a speed of the vehicle;

2) position calculating and memorizing means for, regarding at least one of right-hand and left-hand sides of the vehicle, calculating and memorizing a vehicle width-wise direction position where a stationary object effective for road shape recognition passes through the related side of the vehicle on the basic of a result of function by the object recognizing means;

3) correspondence determining means for determining whether or not an object currently handle by the object recognizing means corresponds to the vehicle width-wise direction position memorized by the position calculating and memorizing means; and 4) road edge recognizing means for, in cases where the correspondence determining means determines that the object currently handled by the object recognizing means corresponds to the vehicle width-wise direction position, recognizing a line connecting the vehicle width-wise wise direction position and the detected position of the object currently handled by the object recognizing means as a road edge.

4. An apparatus as recited in claim 3, wherein the position calculating and memorizing means comprises means for calculating and memorizing an average among vehicle width-wise direction positions for effective stationary objects, wherein the correspondence determining means comprises means for using the average as the vehicle width-wise direction position, and wherein the road edge recognizing means comprises means for using the average as the vehicle width-wise direction position.

5. An apparatus as recited in claim 3, wherein the position calculating and memorizing means comprises means for calculating and memorizing a vehicle width-wise direction position or an average position for the right-hand side of the vehicle, and means for calculating and memorizing a vehicle width-wise direction position or an average position for the left-hand side of the vehicle, wherein the correspondence determining means comprises means for determining whether or not a currently handled object corresponds to the vehicle width-wise direction position or the average position for the right-hand side of the vehicle, and means for determining whether or not a currently-handled object corresponds to the vehicle width-wise direction position or the average position for the left-hand side of the vehicle, and wherein the road edge recognizing means comprises means for recognizing right-hand and left-hand road edges on the basis of the vehicle width-wise direction positions or the average positions for the right-hand and left-hand sides of the vehicle and a result of function by the correspondence determining means.

6. An apparatus as recited in claim 3, wherein the road edge recognizing means comprises means for, in cases where there are a plurality of objects determined to correspond to the vehicle width-wise direction position, implementing interpolation with respect to regions between the objects to form lines connecting the objects and recognizing the lines connecting the objects and a line connecting the vehicle width-wise direction position and the detected position of nearest one of the objects as a road edge.

7. An apparatus as recited in claim 3, wherein the position calculating and memorizing means comprises means for calculating a circle whose tangent vector is equal to a relative speed vector of the effective stationary object, and whose center is on a vehicle width-wise direction, and means for using a point of intersection between the circle and the vehicle width-wise direction as the vehicle width-wise direction position.

8. An apparatus as recited in claim 4, wherein the position calculating and memorizing means comprises means for calculating a first average among vehicle width-wise direction positions through a simple mean process, means for disregarding each vehicle width-wise direction position which differs from the first average by at least a predetermined value, means for, in cases where the number of the vehicle width-wise direction positions except the disregarded positions is equal to or greater than a predetermined number, calculating a second average among the vehicle width-wise direction positions except the disregarded positions and using the second average as the final average, and means for, in cases where the number of the vehicle width-wise direction positions except the disregarded positions is smaller than the predetermined number, determining that the calculation of the final average is impossible.

9. An apparatus as recited in claim 3, wherein the correspondence determining means comprises means for setting an object as an object to be determined which satisfies execution allowance conditions such that the object is stationary and a distance to the object is equal to or less than a predetermined value, and means for, in cases where an absolute value of a difference between a vehicle width-wise direction position of the determination object and the vehicle width-wise direction position memorized by the position calculating and memorizing means is smaller than a predetermined value, determining that the determination object and the vehicle width-wise direction position correspond to each other.

10. An apparatus as recited in claim 9, wherein the predetermined value in the execution allowance conditions which occurs in the presence of a chance that the vehicle changes lane is smaller than that occurring in the absence of the chance.

11. An apparatus as recited in claim 3, further comprising erroneous correspondence determining means for, regarding the object which is determined by the correspondence determining means to correspond to the vehicle width-wise direction position, determining whether or not an object on the opposite road side is erroneously determined to correspond to the vehicle width-wise direction position while considering conditions of a curvature of a road which occur during a predetermined time interval past, and for, when it is determined that an object on the opposite road side is erroneously determined to correspond to the vehicle width-wise direction position, correcting the determination and newly determining that the object does not correspond to the vehicle width-wise direction position and causing the object to be unused by the road edge recognizing means.

12. An apparatus as recited in claim 11, wherein the erroneous correspondence determining means comprises means for calculating a circle whose tangent vector is equal to a relative speed vector of the effective stationary object, and whose center is on a vehicle width-wise direction, means for setting a radius of the circle as a curvature radius of a road, and means for, in cases where an absolute value of a difference between a vehicle width-wise direction position of the determination object which is predicted from a curvature radius available in a predetermined time interval past and the vehicle width-wise direction position memorized by the position calculating and memorizing means which corresponds to the opposite road side is smaller than a predetermined value, determining that the correspondence is erroneous.

13. An apparatus as recited in claim 12, wherein the erroneous correspondence determining means comprises means for, in cases where a stationary object on the opposite road side is not detected so that the vehicle width-wise direction position for the erroneous corresponding determination is unavailable, calculating a virtual vehicle width-wise direction position corresponding to the opposite road side on the basis of a road width and the vehicle width-wise direction position of the stationary object being the determination object, and using the virtual vehicle width-wise direction position in the erroneous correspondence determination.

14. A recording medium storing a program for controlling a computer operating as the recognizing means in the apparatus of claim 3.

15. An apparatus for a vehicle, comprising:
first means for periodically detecting stationary objects in an area extending ahead of the vehicle;
second means for calculating positions of the stationary objects detected by the first means relative to the vehicle;
third means for calculating speeds of the stationary objects detected by the first means relative to the vehicle;
fourth means for, from the positions calculated by the second means and the speeds calculated by the third means, predicting positions on a transverse axis with respect to the vehicle through which the stationary objects detected by the first means will pass as viewed from the vehicle;
fifth means for selecting positions from among the positions predicted by the fourth means;
sixth means for calculating an average position among the positions selected by the fifth means;
seventh means for selecting at least one stationary object from among the stationary objects detected by the first means; and
eighth means for recognizing a line connecting the average position calculated by the sixth means and the position of the stationary object selected by the seventh means as a road edge.

\* \* \* \* \*